United States Patent [19]

Wiesel et al.

[11] 4,026,931
[45] May 31, 1977

[54] PROCESS FOR DYEING POLYURETHANE PLASTICS

[75] Inventors: Manfred Wiesel; Richard Sommer, both of Leverkusen; Georg Pape, Opladen; Michael Kressner, Odenthal, all of Germany

[73] Assignee: Bayer Aktiengesellschaft, Leverkusen, Germany

[22] Filed: July 25, 1975

[21] Appl. No.: 599,031

[30] Foreign Application Priority Data

Aug. 3, 1974 Germany .................. 2437489

[52] U.S. Cl. .............. 260/2.5 AK; 260/37 N; 260/77.5 AM
[51] Int. Cl.$^2$ .............. C08K 5/23; C08K 5/43
[58] Field of Search .......... 260/37 N, 199, 205, 260/206, 207, 207.1, 207.5, 77.5 AM, 2.5 AK

[56] References Cited

UNITED STATES PATENTS

| | | | |
|---|---|---|---|
| 3,137,671 | 6/1964 | Bosshord et al. | 260/858 X |
| 3,278,486 | 10/1966 | Meek et al. | 260/77.5 AP X |
| 3,375,240 | 3/1968 | Beffa et al. | 260/37 N X |
| 3,422,063 | 2/1976 | Wolf et al. | 260/2.5 AK X |
| 3,579,498 | 5/1971 | Dunworth | 260/207 X |
| 3,600,373 | 8/1971 | Zickendraht et al. | 260/37 N X |
| 3,843,625 | 10/1974 | Desai et al. | 260/207 X |
| 3,880,797 | 4/1975 | Maeda et al. | 260/37 N |
| 3,883,502 | 5/1975 | Sommer et al. | 260/206 X |
| 3,892,725 | 7/1975 | Stiot et al. | 260/205 X |

*Primary Examiner*—Sandra M. Person
*Attorney, Agent, or Firm*—Plumley and Tyner

[57] ABSTRACT

A process for dyeing polyurethane plastics is disclosed in which an azo dyestuff derived from an indole or 5-aminopyrazole coupling component and containing at least one group having an active hydrogen atom, e.g. hydroxyl or amino, is introduced during the reaction forming the polyurethane whereby the dyestuff is bonded to the polyurethane by a covalent bond resulting from reaction of the active hydrogen on the dyestuff with a polyurethane reaction component, e.g. polyisocyanate. The dyed polyurethanes produced by this process having a very high level of fastness, e.g. fastness to bleeding upon overcoating.

6 Claims, No Drawings

PROCESS FOR DYEING POLYURETHANE PLASTICS

This invention relates to a process for dyeing polyurethane plastics with dyes which are suitable for incorporation into the plastic through the development of covalent bonds, distinguished by the fact that dyes corresponding to formula I below are added to the reaction mixture or to one of the components therefore before or during the polyaddition reaction:

$$\left[ \begin{array}{c} R_1 \\ R_2 \\ \phantom{x}\\ R_4 \\ R_3 \end{array} \hspace{-2mm}\bigcirc\hspace{-2mm} -N=N-K \right] -(XH)_n \quad (I)$$

In this formula
- $R_1$ represents cyano, halogen, alkyl, trifluoromethyl, alkyl sulphonyl, aryl sulphonyl, aralkyl sulphonyl, optionally monosubstituted or disubstituted carbamoyl or sulphamoyl and carbalkoxy or, taken together with $R_2$, forms the remaining members of a benzene ring condensed in the 2- or 3-position with respect to the azo group,
- $R_2$ represents hydrogen, halogen, trifluoromethyl, alkyl or taken together with $R_1$, forms the remaining members of a benzene ring condensed in the 2- and 3-position with respect to the azo group,
- $R_3$ represents hydrogen, halogen, cyano, alkoxy or alkyl and
- $R_4$ represents hydrogen, alkyl sulphonyl, aryl, sulphonyl, aralkyl sulphonyl or $$-Y-N\begin{array}{c} R_5 \\ \phantom{x} \\ R_6 \end{array}$$

where
- $R_5$ represents hydrogen, alkyl, cycloalkyl, aralkyl, aryl, hetaryl or, taken together with $R_6$ and the nitrogen atom, represents a heterocyclic radical,
- $R_6$ represents hydrogen, alkyl, aralkyl, aryl or, together with $R_5$ and the nitrogen atom, represents a heterocyclic radical and
- Y represents $SO_2$ or CO,
- K represents a coupling component from the indole or 5-aminopyrazole series,
- X represents O, NH or N—$(C_1-C_4)$-alkyl and
- $n$ is the number 1, 2, 3 or 4, the XH-group being attached to one or more substituents $R_1$, $R_2$, $R_3$, $R_4$ or to a substituent of the coupling component.

Suitable halogen atoms $R_1$, $R_2$ and $R_3$ are, in particular, chlorine and bromine.

Suitable alkyl sulphonyl groups $R_1$ or $R_4$ are, in particular, $C_1-C_4$-alkyl sulphonyl which may be further substituted by OH, CN, Cl or Br, such as methyl sulphonyl, ethyl sulphonyl or 2-cyanoethyl sulphonyl.

Suitable aryl sulphonyl groups $R_1$ or $R_4$ are, for example, phenyl sulphonyl optionally further substituted by chlorine, bromine, methyl, methoxy or cyano.

Suitable aralkyl sulphonyl groups $R_1$ or $R_4$ are, for example, benzyl or phenethyl sulphonyl optionally further substituted by chlorine, bromine, methyl, methoxy or cyano.

The sulphamoyl and carbamoyl groups $R_1$ correspond to the formula $$-Y-N\begin{array}{c} R_5 \\ \phantom{x} \\ R_6 \end{array}$$

Suitable carbalkoxy groups $R_1$ contain from 1 to 4 carbon atoms in the alkoxy portion and may be further substituted, for example, by hydroxy, chlorine, bromine, cyano, amino, methyl and ethyl amino, phenyl, chlorophenyl or tolyl, for example carbomethoxy, carboethoxy, carbopropoxy, carbobutoxy, carbo-2-hydroxy ethoxy, carbobenzyloxy or carbo-2-chloroethoxy.

Suitable alkyl groups $R_1$, $R_2$ and $R_3$ are, in particular, $C_1-C_4$-alkyl which may be substituted by cyano, halogen or hydroxy, for example methyl, ethyl, propyl, butyl, β-cyanoethyl or β-hydroxy ethyl.

Suitable alkyl groups $R_5$ and $R_6$ are, in particular, $C_1-C_6$-alkyl which may be substituted, for example, by hydroxy, amino, methyl amino, ethyl amino, chlorine, bromine, cyano, $C_1-C_4$-alkoxy and $C_1-C_4$-alkoxy carbonyl.

Suitable alkoxy groups $R_3$ are, for example, $C_1-C_4$ alkoxy which may optionally be further substituted for example by hydroxy, such as methoxy, ethoxy, propoxy, butoxy and β-hydroxy ethoxy.

Suitable cycloalkyl groups $R_5$ are, in particular, cyclopentyl and cyclohexyl.

Suitable aralkyl groups $R_5$ and $R_6$ are benzyl, 1- and 2-phenyl ethyl which may be further substituted, for example, by chlorine, bromine, cyano, $C_1-C_4$-alkoxy, but in particular benzyl, 1- and 2-phenethyl.

Suitable aryl groups $R_5$ and $R_6$ are, in particular, phenyl or naphthyl optionally substituted by $C_1-C_4$-alkyl, $C_1-C_4$-alkoxy, chlorine, bromine, cyano or trifluoromethyl.

Suitable hetaryl groups $R_5$ are, for example, 3-sulpholanyl, 2-benzthiazolyl and 2-imidazolyl.

Suitable heterocycles formed from $R_5$, $R_6$ and the nitrogen atom are, for example, pyrrolidinyl, piperidinyl and morpholinyl.

Suitable coupling components KH of the indole and 5-amino pyrazole series are those corresponding to the formula in which
- $R_7$ represents alkyl or aryl,
- $R_8$ represents hydrogen or alkyl,
- $R_9$ represents hydrogen, halogen, alkyl, alkoxy or cyano,
- $m$ = 1 or 2

$R_{10}$ represents hydrogen, alkyl, cycloalkyl, aralkyl or aryl or a heterocyclic radical, $R_{11}$ represents alkyl, aryl, carbalkoxy or carbamoyl.

Suitable alkyl groups $R_7$ are, in particular, unsubstituted $C_1$-$C_4$-alkyl groups such as methyl, ethyl, propyl, n-butyl and isobutyl.

Suitable aryl groups $R_7$ are, in particular, phenyl or naphthyl radicals optionally further substituted by chlorine, bromine, methyl, methoxy or phenyl, such as phenyl, naphthyl, p-biphenyl-4-chlorophenyl, 2,4-dichlorophenyl, 4-bromophenyl, 4-methyl phenyl, or 4-methoxy phenyl.

Suitable alkyl radicals $R_8$ are those having 1 to 8 carbon atoms, more especially $C_1$-$C_4$ alkyl radicals which may be further substituted by —CH, —CONH$_2$, —COOH, —C$_6$H$_5$, —OH, —OC$_1$—C$_4$-alkyl, O-phenyl, —O—COC$_1$—C$_4$-alkyl, —OCOC$_6$H$_5$, -NHCOOC$_1$-C$_4$-alkyl, —NHCOC$_1$—C$_4$-alkyl, for example —CH$_3$, —C$_2$H$_5$, —C$_3$H$_7$, —C$_4$H$_9$, —CH$_2$CH$_2$CN, —CH$_2$CH$_2$CONH$_2$, —CH$_2$CH$_2$COOH,

—CH$_2$CH$_2$OH—CH$_2$—CH(OH)—CH$_3$, —CH$_2$—CH(OH)—CH$_2$—CH$_3$,

—CH$_2$—CH(OH)—CH$_2$CH$_2$CH$_3$,

—CH$_2$—CH(OH)(CH$_2$)$_5$CH$_3$,

—CH(CH$_2$OH)—CH$_3$, —CH(CH$_2$OH)—CH$_2$CH$_3$,

—CH$_2$—C$_6$H$_5$, —CH$_2$CH$_2$C$_6$H$_5$,

—CH$_2$—CH(OH)—C$_6$H$_5$, —CH$_2$—CH(OH)—C$_6$H$_4$CH$_3$(p),

—CH$_2$CH$_2$Cl, —CH$_2$CH$_2$OCH$_3$,

—CH$_2$—CH(OCH$_3$)—CH$_3$,

—CH$_2$CH$_2$OC$_6$H$_5$,

—CH(CH$_2$OC$_6$H$_5$)—CH$_3$, —CH$_2$CH(OC$_6$H$_5$)—CH$_2$CH$_3$,

—CH$_2$CH$_2$OCOCH$_3$, —CH$_2$CH$_2$OCOC$_6$H$_5$,

—CH$_2$—CH(OCOCH$_3$)—CH$_3$, —CH$_2$—CH(OCOC$_6$H$_5$)—CH$_3$, —CH$_2$—CH(OCOCH$_3$)—C$_6$H$_5$,

—CH$_2$—CH(OCOC$_6$H$_5$)—C$_6$H$_5$, —CH$_2$—CH(OH)—CH$_2$OC$_6$H$_5$,

—CH$_2$CH$_2$CH$_2$NHCOOCH$_3$, —CH$_2$CH$_2$CH$_2$NHCOC$_2$H$_5$, —CH$_2$CH$_2$CH$_2$NHCOOCH$_3$.

Suitable alkyl and alkoxy groups $R_9$ having 1 to 4 carbon atoms are, for example, —CH$_3$, —C$_2$H$_5$, i-C$_3$H$_7$, n-C$_4$H$_9$, OCH$_3$, OC$_2$H$_5$, OC$_3$H$_7$, OC$_4$H$_9$. In this respect halogen is, in particular, chlorine, bromine and fluorine.

Suitable alkyl groups $R_{10}$ are $C_1$-$C_6$alkyl groups which may be substituted by non-ionic substitutents such as, for example, chlorine, bromine, cyano, $C_1$-$C_4$ alkoxy, carbamoyl, alkoxy carbonyl with 1 to 4 carbon atoms in the alkoxy radical or hydroxy, such as methyl, ethyl, propyl, isopropyl, butyl, isobutyl, pentyl, isopentyl, hexyl, isohexyl, 1,1-dimethoxy-2-propyl, 2-cyanoethyl, 4-hydroxy butyl, 1-hydroxy-2-propyl, 1,2-dihydroxy-3-butyl, 2,3-dihydroxy propyl, (2-hydroxy ethyl)-2-oxyethyl, 2-(2-hydroxy ethoxy carbonyl)-ethyl, 2-hydroxy ethyl and 3-hydroxy propyl.

Suitable cycloalkyl radicals $R_{10}$ are, in particular, cyclohexyl and cyclopentyl.

Suitable aralkyl radicals $R_{10}$ are, in particular, benzyl and 1- and 2-phenethyl radicals which may be substituted by non-ionic substituents, such as hydroxy, chlorine, bromine, cyano, $C_1$-$C_4$ alkyl or $C_1$-$C_4$ alkoxy, for example benzyl, 4-chlorobenzyl, 4-hydroxy benzyl, 4-methoxy benzyl, 1-phenethyl or 2-phenethyl.

Suitable aryl groups $R_{10}$ are phenyl or naphthyl which may be substituted by non-ionic substituents such as $C_1$-$C_4$ alkyl, $C_1$-$C_4$ alkoxy, hydroxy, chlorine, bromine, cyano, monosubstituted or disubstituted carbamoyl or sulphamoyl, or carbalkoxy having 1 to 4 carbon atoms in the alkoxy radical, the $C_1$-$C_4$-alkyl groups optionally containing further non-ionic substituents, above all hydroxy, such as for example phenyl, 2-chlorophenyl, 2,5-dichlorophenyl, 4-chlorophenyl, 4-methyl phenyl, 3-methyl phenyl, 4-hydroxy methyl phenyl, 3-chloro4-hydroxy methyl phenyl, 4-hydroxy phenyl, 2-[N-(2-hydroxy ethyl)-sulphamoyl]-phenyl, 2[N,N-bis-(2-hydroxy ethyl) sulphamoyl]-phenyl, 4-(N-methyl-sulphamoyl)-phenyl, 4-[N-methyl-N-(2-hydroxy propyl)-sulphamoyl]-phenyl, 4-[N,N-bis-(2-hydroxy-butyl)-sulphamoyl]-phenyl, 4-methoxyphenyl, 2-cyanophenyl or 4-carbomethoxy phenyl.

Suitable heterocyclic radicals $R_{10}$ are, for example, the 3-sulpholanyl radical or the 2-benzthiazolyl radical.

Suitable alkyl groups $R_{11}$ are $C_1$-$C_2$ alkyl, especially unsubstituted $C_1$-$C_2$ alkyl.

Suitable aryl groups $R_{11}$ are, for example, phenyl or o-, m- or p-tolyl.

Suitable carbalkoxy groups $R_{11}$ contain in particular 1 to 4 carbon atoms in the alkoxy radical, for example, carbomethoxy, carboethoxy, carbopropoxy or carbobutoxy.

Suitable carbamoyl groups $R_{11}$ are monosubstituted or disubstituted carbamoyls, the substituents being, in particular, $C_1$-$C_4$-alkyl groups optionally substituted by hydroxy.

Preferred dyes correspond to the formula (IV)

[structural formula with substituents $R_1'$, $R_2'$, $R_3'$, $R_4$, $R_7$, $R_8$, $R_9$, and (OH)$_n$]

in which
$R_4$, $R_7$, $R_8$, $R_9$ and $n$ are as defined above,
$R_1'$ represents cyano, halogen, trifluoromethyl, methyl and carbamoyl or sulphamoyl optionally monosubstituted or disubstituted by $C_1$-$C_6$ alkyl, $R_2'$ represents hydrogen, cyano, halogen, methoxy or methyl, $R_3'$ represents hydrogen, halogen, methyl or trifluoromethyl, and the OH-groups are attached to the molecule through alkylene radicals.

Particularly preferred dyes correspond to the formula

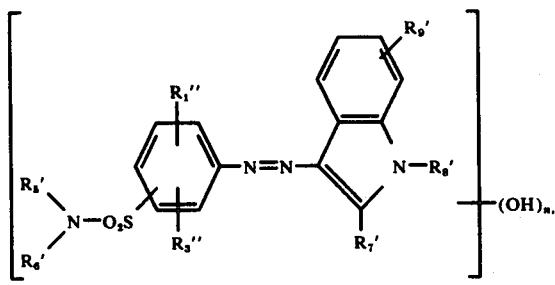

(V)

in which in which
$R_1''$ represents cyano, chlorine, bromine or methyl,
$R_3''$ represents hydrogen, chlorine, bromine or methyl,
$R_5'$ represents hydrogen alkyl, cyclohexyl, benzyl, phenethyl, phenyl, tolyl optionally substituted by hydroxy, cyano, chlorine, bromine or $C_1$-$C_4$ alkoxy or, taken together with $R_6'$ and the nitrogen atom, represents pyrrolidinyl, piperidinyl or morpholinyl,
$R_6'$ represents hydrogen, $C_1$-$C_4$ alkyl, benzyl, phenethyl, phenyl or tolyl optionally substituted by hydroxy, cyano, chlorine, bromine or $C_1$-$C_4$ alkoxy or, taken together with $R_5'$ and the nitrogen atom, represents pyrrolidinyl, piperidinyl or morpholinyl,
$R_7$ represents methyl, ethyl, phenyl, o-, m- or p-chlorophenyl, o-, m- or p-bromophenyl, o, m, or p-methoxy phenyl or biphenyl,
$R_8'$ represents hydrogen or $C_1$-$C_4$ alkyl optionally substituted by OH, CN, $CONH_2$ or COOH,
$R_9'$ represents hydrogen, $C_1$-$C_4$ alkyl, $C_1$-$C_4$ alkoxy, chlorine or bromine, and
$n'$ is the number 1, 2 or 3, and in which the OH-groups are attached to the molecule through alkylene radicals; and in particular to the formula

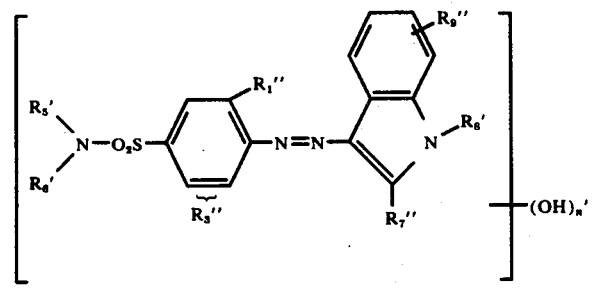

(VI)

in which
$R_1''$, $R_3''$, $R_5'$, $R_6'$, $R_8'$ and $n'$ are as defined above,
$R_7''$ represents methyl, ethyl, phenyl, p-biphenyl, or o-, m- or p-chlorophenyl, $R_9''$ represents hydrogen, chlorine, bromine, methyl, ethyl, methoxy or ethoxy and the OH-groups are attached to the molecule through alkylene radicals.

Other preferred dyes correspond to the formula

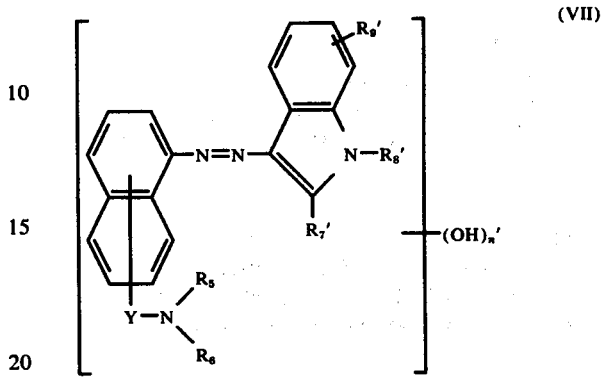

(VII)

in which
$R_5$, $R_6$, Y, $R_7'$, $R_8'$, $R_9'$ and $n'$ are as defined above, and the OH-groups are attached to the molecule through alkylene radicals, and in particular to the formula

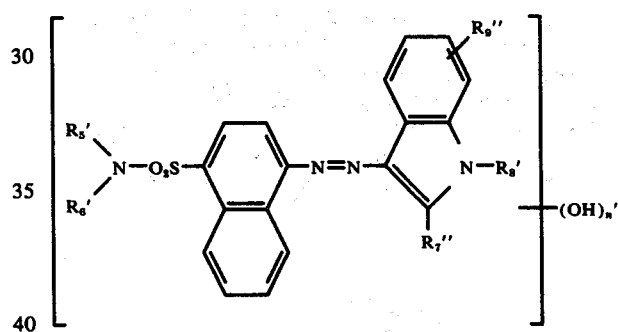

(VIII)

in which
$R_5'$, $R_6'$, $R_7''$, $R_8'$, $R_9''$ and $n'$ are as defined above, and the OH-groups are attached to the molecule through alkylene radicals.

Other preferred dyes are those corresponding to the formula

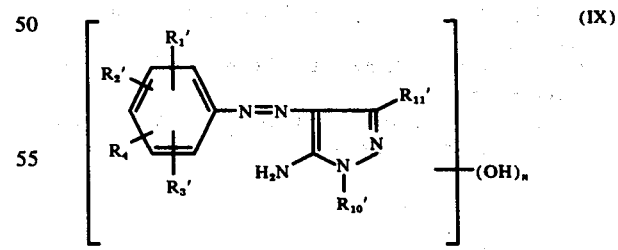

(IX)

in which
$R_1'$, $R_2'$, $R_3'$, $R_4$ and $n$ are as defined above,
$R_{10}'$ represents hydrogen, $C_1$-$C_4$ alkyl, benzyl, 2-phenethyl optionally substituted by hydroxy or cyano and carbamoyl or sulphamoyl optionally monosubstituted or disubstituted by $C_1$-$C_6$ alkyl or phenyl substituted by chlorine or methyl or 3-sulpholanyl, methyl, ethyl, or $C_2$-$C_5$ carboalkoxy, and the OH-groups are attached to the molecule through alkylene radicals, and more especially those corresponding to the formula

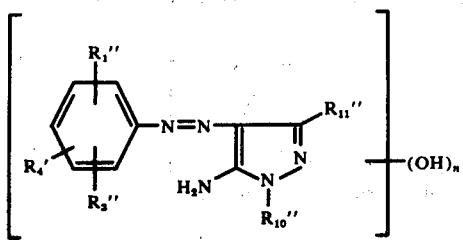 (X)

in which
R₁'', R₃'' and n are as defined above,
R₄' represents hydrogen, unsubstituted C₁-C₄ alkyl sulphonyl, phenyl sulphonyl or the radical

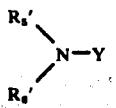

in which
R₅', R₆' and Y are as defined above,
R₁₀'' represents hydrogen, C₁-C₄ alkyl optionally substituted by hydroxy, phenyl optionally substituted by chlorine, methyl or by sulphamoyl monosubstituted or disubstituted by C₁-C₄ alkyl,
R₁₁'' represents methyl, and the
OH-groups are attached to the molecule through alkylene radicals,
in particular those corresponding to the formula

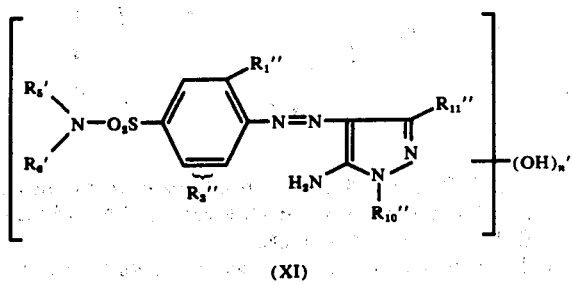

(XI)

in which
R₁'', R₃'', R₅', R₆', R₁₀'', R₁₁'' and n' are as defined above, and the
OH-groups are attached to the molecule through alkylene radicals.

The dyes are obtained by coupling diazotised amines corresponding to the formula

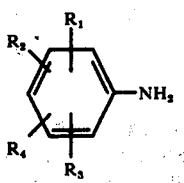 (XII)

with coupling components corresponding to formula (II) or (III), in which R₁, R₂, R₃, R₄, R₇, R₈, R₉, R₁₀, R₁₁ and m are as defined above by methods known per se.

The following are examples of suitable amines corresponding to formula XII:

4,6-chlorine-aniline-2-(N,N-dimethyl sulphonamide),
4,6-dichloro-aniline-2-(N-methyl sulphonamide),
4,5-dichloro-aniline-4-(N-methyl sulphonamide),
4,5-dichloro-aniline-4-[N-(3-hydroxy butyl)-sulphonamide],
4,5-dichloro-aniline-4-(N-benzyl-sulphonamide),
2,5-dichloro-aniline-4-(N-2-methoxy ethyl-sulphonamide),
N-(2,5-dichloro-4-amino-benzene-sulphonyl)-morpholine,
N-(2,5-dichloro-4-amino-benzene-sulphonyl)-piperidine,
2,5-dichloro-aniline-4-[N-sulpholanyl-(3)-sulphonamide],
2,5-dichloro-aniline-4-[N-methyl-N-sulpholanyl-(3)-sulphonamide],
2,5-dichloro-aniline-4-(N-methoxy propyl-sulphonamide),
2,5-dichloro-aniline-4-(N-isopropyl-sulphonamide),
2,5-dichloro-aniline-4-[N-(2-phenyl ethyl)-sulphonamide],
4,5-dichloro-aniline-2-(N,N-dimethyl-sulphonamide),
4,5-dichloro-aniline-2-(N,N-diethyl-sulphonamide),
4,5-dichloro-aniline-2-(N-ethyl-sulphonamide),
2,5-dichloro-aniline-4-sulphonamide,
2,5-dichloro-aniline-4-(N-methyl-sulphonamide),
2,5-dichloro-aniline-4-(N-ethyl-sulphonamide),
2,5-dichloro-aniline-4-(N-propyl-sulphonamide),
2,5-dichloro-aniline-4-(N-butyl-sulphonamide),
2,5-dichloro-aniline-4-(N-benzyl-sulphonamide),
2,5-dichloro-aniline-4-(N-phenyl-sulphonamide),
2,5-dichloro-aniline-4-[N-(m-tolyl)-sulphonamide],
2,5-dichloro-aniline-4-[N-(3-chloropropyl)-sulphonamide],
2,5-dichloro-aniline-4-[N-(2-hydroxy ethyl)-sulphonamide],
2,5-dichloro-aniline-4-[N-(3-hydroxy propyl)-sulphonamide],
2,5-dichloro-aniline-4-[N-(3-hydroxy butyl)-sulphonamide],
2,5-dichloro-aniline-4-(N-cyclohexyl-sulphonamide),
2,5-dichloro-aniline-4-(N,N-dimethyl-sulphonamide),
2,5-dichloro-aniline-4-(N,N-diethyl-sulphonamide),
2,5-dichloro-aniline-4-[N,N-bis-(2-hydroxy ethyl)-sulphonamide],
2,5-dichloro-aniline-4-(N,N-tetramethylene sulphonamide),
2,5-dichloro-aniline-4-(N,N-pentamethylene-sulphonamide),
2,6-dichloro-aniline-4-sulphonamide,
2,6-dichloro-aniline-4-(N-methyl-sulphonamide),
2,6-dichloro-aniline-4-(N-ethyl-sulphonamide),
2,6-dichloro-aniline-4-[N(2-hydroxy ethyl)-sulphonamide],
2,6-dichloro-aniline-4-(N-benzyl-sulphonamide),
2,6-dichloro-aniline-4-(N-phenyl-sulphonamide),
2,6-dichloro-aniline-4-[N-(3-hydroxy butyl)-sulphonamide],
2,6-dichloro-aniline-4-(N,N-diethyl-sulphonamide),
2,6-dichloro-aniline-4-(N-methyl-N-phenyl-sulphonamide),
1-methyl-aniline-2,4-bis-(N-ethyl-sulphonamide),
1-methyl-aniline-2,4-bis-[N-(2-hydroxy ethyl)-sulphonamide],
2,6-dichloro-aniline-4-[N-methyl-N-(2-hydroxy ethyl)-sulphonamide],
2,6-dichloro-aniline-4-(N,N-pentamethylene sulphonamide), 2,6-dichloro-aniline-4-[N,N-bis-(2-hydroxy ethyl)-sulphonamide],
2,chloro-5-bromo-aniline-4-(N,N-dimethyl-sulphonamide),
2-chloro-5-bromo-aniline-(4-N-ethyl-sulphonamide),
2-chloro-5-bromo-aniline-4-(N-benzyl-sulphonamide),
2-chloro-5-bromo-aniline-4-[N,N-bis-(2-hydroxy ethyl)-sulphonamide],
2-chloro-5-bromo-aniline-4-(N-cyclohexyl-sulphonamide),
2-chloro-5-bromo-aniline-4-(N,N-dipropyl-sulphonamide),
2-bromo-5-chloro-aniline-4-(N,N-dimethyl-sulphonamide),
2-bromo-5-chloro-aniline-4-[N-(2-hydroxy propyl)-sulphonamide],
2-bromo-5-chloro-aniline-4-(N-ethyl-sulphonamide),
2-chloro-6-bromo-aniline-4-(N-methyl-sulphonamide),
2-chloro-6-bromo-aniline-4-(N,N-diethyl-sulphonamide),
2-chloro-6-bromo-aniline-4-(N-phenyl-sulphonamide),
2,5-dibromo-aniline-4-(N-benzyl-sulphonamide),
2,5-dibromo-aniline-4-(N,N-diethyl-sulphonamide),
2,5-dibromo-aniline-4-(N,N-pentamethylene-sulphonamide),
2,5-dibromo-aniline-4-[N-methyl-N-(2-hydroxy ethyl)-sulphonamide],
2,6-dibromo-aniline-4-(N,N-dimethyl-sulphonamide),
2,6-dibromo-aniline-4-[N-(2-hydroxy ethyl)-sulphonamide],
2,6-dibromo-aniline-4-(N-propyl-sulphonamide),
2,6-dibromo-aniline-4-(N-butyl-sulphonamide),
2-chloro-6-methyl-aniline-4-(N-methyl-sulphonamide),
2-chloro-6-methyl-aniline-4-sulphonamide,
2-chloro-6-methyl-aniline-4-(N,N-diethyl-sulphonamide),
4-chloro-6-methyl-aniline-2-(N,N-diethyl-sulphonamide),
4-chloro-6-methyl-aniline-2-[N-(2-hydroxy ethyl)-sulphonamide]
4-chloro-6-methyl-aniline-2-(N,N-dimethyl-sulphonamide),
4-chloro-5-methyl-aniline-2-(N,N-diethyl-sulphonamide),
4-chloro-5-methyl-aniline-2-(N,N-dimethyl-sulphonamide),
6-chloro-aniline-2,4-bis-(N-ethyl sulphonamide),
2-trifluoromethyl-5-chloro-aniline-4-(N-methyl sulphonamide),
2-trifluoromethyl-5-chloro-aniline-4-[N-(2-hydroxy ethyl)sulphonamide],
2,5,6-trichloro-aniline-3-sulphonamide,
2,5,6-trichloro-aniline-3-(N-methyl-sulphonamide),
2,5,6-trichloro-aniline-3-[N-methyl-N-(2-hydroxy ethyl)sulphonamide],
2,5,6-trichloro-aniline-3-(N,N-diethyl-sulphonamide),
2-chloro-aniline-4-(N,N-diethyl-sulphonamide),
2-chloro-aniline-4-[N,N-bis-(2-hydroxy ethyl)-sulphonamide],
2-chloro-aniline-5-[N,N-bis-(2-hydroxy ethyl)-sulphonamide],
2-chloro-aniline-5-(N-ethyl-sulphonamide),
2-cyano-aniline-4-(N,N-dipropyl-sulphonamide),
2-cyano-aniline-4-[N-(2-hydroxy propyl)-sulphonamide],
2,5-dicyano-aniline-4-(N,N-diethyl-sulphonamide),
2,6-dicyano-aniline-4-(N-methyl-sulphonamide),
2,6-dicyano-aniline-4-[N-(2-hydroxy propyl)-sulphonamide],
2,5-dichloro-aniline-4-[N-(3-aminopropyl)-sulphonamide],
2-chloro-aniline-4-[N-(3-methylamino-propyl)-sulphonamide],
1-amino-naphthalene-4-(N,N-dimethyl-sulphonamide),
1-amino-naphthalene-4-[N,N-bis-(2-hydroxy ethyl)-sulphonamide],
1-amino-naphthalene-4-[N-methyl-N-(2-cyanoethyl)-sulphonamide],
1-amino-naphthalene-4-[N-(2-phenyl ethyl)-sulphonamide],
2-methylsulphonyl-aniline-4-(N-ethyl-sulphonamide),
2-[(2-cyanoethyl)-sulphonyl]-aniline-4-(N-methyl-sulphonyl amide),
4-ethyl sulphonyl-aniline-2-(N-methyl sulphonamide),
2,4-dichloro-aniline-5-(N,N-diethyl carbonamide),
2,4-dichloro-aniline-5-[N-(2-hydroxy ethyl)-N-methyl-carbonamide],
2,4-dichloro-aniline-5-[N,N-bis-(2-hydroxy ethyl)-carbonamide],
2-chloro-4-methyl-aniline-5-(N,N-dimethyl carbonamide),
2-chloro-4-methyl-aniline-5-(N-methyl-N-benzyl-carbonamide),
2-chloro-aniline-5-[N-methyl-N-(2-hydroxy ethyl)-carbonamide],
2-trifluoromethyl-aniline-4-(N,N-dimethyl carbonamide),
2,5-dichloro-aniline-4-[N,N-bis-(2-hydroxy ethyl)-carbonamide],
2,5-dichloro-aniline-4-[N-methyl-N-(2-hydroxy ethyl)-carbonamide],
2,5-dichloro-aniline-4-(N-cyclohexyl-carbonamide),
4-chloro-aniline-2-(N,N-dimethyl-carbonamide),
4-chloro-aniline-2-(N-ethyl-carbonamide),
4,6-dichloro-aniline-2-(N,N-diethyl-carbonamide),
4,6-dichloro-aniline-2-(N-methyl-N-benzyl-carbonamide),
4,6-dibromo-aniline-2-N,N-diethyl-carbonamide),
2,4,5-trichloro-aniline, 2,4-dichloro-aniline, 4-methyl sulphonylaniline,
2,4-dibromo-aniline, 2-methyl-4-chloro-aniline,
2-trifluoro-methyl-4-chloro-aniline, 2-carbomethoxy-4-chloroaniline,
2,5-bis-carbethoxy-aniline, 2,5-bis-(N-methyl-carbamoyl)-aniline,
2-chloro-4-carbopropoxy-aniline, 2-chloro-4-methyl sulphonyl-aniline, 2-cyano-5-chloroaniline, 3,4-dicyanoaniline,
2,5-dichloro-4-cyano-aniline, 3-chloro-4-cyanoaniline,
2,4-dicyanoaniline, 2,4-dicyano-6-chloroaniline, 2,5-dichloro-4-cyanoaniline,
2,6-dicyano-4-methoxy carbonyl aniline,
2,4-dicyano-3,5-dimethyl aniline, 2,5-dicyano aniline,
2,6-dicyano-4-methyl aniline, 2,5-dicyano-4,6-dichloro aniline,
2,6-dicyano-4-chloro-aniline, 2,4,6-tricyanoaniline,
2,5-dicyano-4-bromonaniline, 2,3,4-trichloro-6-cyanoaniline,
2-carboxy-4-cyanoaniline, 2,4-dicyano-6-methyl-aniline,
2-methoxy-4-cyanoaniline, 2,6-dichloro-4-cyanoaniline, 2,3,6-trichloro-4-cyanoaniline, 2-cyano-4-(2-hydroxy ethyl)-aniline, 2-cyano-4-methyl sulphonyl aniline, 2-cyano-4-phenyl sulphonyl aniline, 2-methyl sulphonyl-4-chloro-aniline.

The following are examples of suitable coupling components corresponding to formula II from the indole series:

2-methyl-indole, 1,2-dimethyl-indole, 1-(2-cyanoethyl)-2-methylindole, 2-[2-methyl-indolyl-(1)]-propionic acid amide, 2-[2-methyl-indolyl-(1)]-propionic acid, 2,5-dimethyl-indole, 2,4-dimethyl-7-methoxy-indole, 2-methyl-5-ethoxy-indole, 2-methyl-5-chloro indole, 2-methyl-6-chloro-indole, 2-methyl-5-nitro-indole, 2-methyl-5-cyano-indole, 2-methyl-7-chloro-indole, 2-methyl-5-fluoro-indole, 2-methyl-5-bromo-indole, 2-methyl-5,7-dichloro-indole, 1-(2-cyanoethyl)-2,6-dimethyl-indole, 2-ethylindole, 2-butyl-indole, 2-phenyl-indole, 2-(4-methyl phenyl)-indole, 2-(4-chlorophenyl)-indole, 2-(4-bromophenyl)-indole, 2-(2,4-dichlorophenyl)-indole, 2-(4-methoxy phenyl)-indole, 2-(p-biphenylyl)-indole, 2-(2-naphthyl)-indole, 1-methyl-2-phenyl-indole, 1-methyl-2-(4-methyl phenyl)-indole, 1-methyl-2-(4-chlorophenyl)-indole, 1-methyl-2-(4-bromo-phenyl)-indole, 1-methyl-2-(2,4-dichlorophenyl)-indole, 1-methyl-2-(4-methoxy phenyl)-indole, 1-methyl-2-(p-biphenylyl)-indole, 1-methyl-2-(2-naphthyl)-indole, 1-ethyl-2-phenyl-indole, 1-ethyl-2-(4-chlorophenyl)-indole, 1-(2-cyanoethyl)-2-phenyl-indole, 1-(2-cyanoethyl)-2-(4-methyl phenyl)-indile, 1-(2-amino carbonyl ethyl)-2-phenyl-indole, 1-(2-aminocarbonyl ethyl)- 2-(4-bromophenyl)-indole, 1-(2-carboxy ethyl)-2-phenyl-indole, 1-benzyl-2-phenyl-indole, 1-(2-phenethyl)-2-phenyl-indole, 1-(2-phenethyl)-2-(4-methyl phenyl)-indole, 1-(2-hydroxy ethyl)-2-phenyl-indole, 1-(2-hydroxy ethyl)-2-(4-chlorophenyl)-indole, 1-(2-hydroxy ethyl)-2-(p-biphenylyl)-indole, 1-(2-hydroxy propyl)-2-phenyl-indole, 1-(2-hydroxy propyl)-2-(4-chlorophenyl) indole, 1-(2-hydroxy-n-butyl)-2-phenyl-indole, 1-(2-hydroxy-n-butyl)-2-(4-chlorophenyl)-indole, 1-(2-hydroxy-n-butyl)-2-(4-methoxy phenyl)-indole, 1-(2-hydroxy-n-octyl)-2-phenyl-indole, 1-(2-hydroxy-2-phenyl ethyl)-2-phenyl-indole, 1-(2-hydroxy-2-phenyl ethyl)-2-(4-methoxy phenyl)-indole, 1-(2-hydroxy-3-phenoxy-propyl)-2-phenyl-indole, 1-(2-hydroxy-3-allyloxy-propyl)-2-phenyl-indole, 1-(2-hydroxy-2-ethoxy carbonyl-ethyl)-2-phenyl-indole, 1-(2-acetoxy propyl)-2-phenyl-indole, 1-(2-benzoyloxy propyl)-2-phenyl-indole, 1-(2-acetoxy-n-butyl)-2-phenyl-indole, 1-(1-hydroxy methyl-ethyl)-2-phenyl-indole, 1-(1-hydroxy methylpropyl)-2-phenyl-indole, 1-(1-acetoxy-methyl-ethyl)-2-phenyl-indole, 1-(1-acetoxy methyl-propyl)-2-phenyl-indole, 1,5-dimethyl-2-phenyl-indole, 1,6-dimethyl-2-phenyl-indole, 1,7-dimethyl-2-phenyl-indole, 1-ethyl-5-methyl-2-phenyl-indole, 1-propyl-5-methyl-2-phenyl-indole, 1,5-dimethyl-2-(4-chloro-phenyl)-indole, 1,7-dimethyl-2-(4-methoxy phenyl)-indole, 1-methyl-7-ethyl-2-phenyl-indole, 1-methyl-7-isopropyl-2-phenyl-indole, 1-(2-hydroxy propyl)-5-methyl-2-phenyl-indole, 1-methyl-5-methoxy-2-phenyl-indole, 1-methyl-6-methoxy-2-phenyl-indole, 1-methyl-7-methoxy-2-phenyl-indole, 1-methyl-5-ethoxy-2-phenyl-indole, 1-methyl-5-propoxy-2-phenyl-indole, 1-(2-cyanoethyl)-5-methoxy-2-phenyl-indole, 1-(2-hydroxy-propyl)-5-methoxy-2-phenyl-indole, 1-(2-hydroxy-2-phenyl-ethyl)-5-methoxy-2-phenyl-indole, 1-methyl-5-methoxy-2-(4-methoxy phenyl)-indole, 1-methyl-5-methoxy-2-(p-biphenylyl)-indole, 1-methyl-5-chloro-2-phenyl-indole, 1-methyl-6-chloro-2-phenyl-indole, 1-methyl-7-chloro-2-phenyl-indole, 1-methyl-5-bromo-2-phenyl-indole, 1-methyl-5-fluoro-2-phenyl-indole, 1-(2-cyanoethyl)-5-chloro-2-phenyl-indole, 1-(2-hydroxy propyl)-5-bromo-2-phenyl-indole, 1-(2-acetoxy propyl)-5-bromo-2-phenyl-indole, 1-(1-hydroxy methyl-ethyl)-5-chloro-2-phenyl-indole, 1-methyl-2-phenyl-5-trifluoromethyl-indole, 1-ethyl-2-phenyl-5-trifluormethyl-indole, 1-(2-hydroxy propyl)-2-phenyl-5-trifluoromethyl-indole, 1-methyl-2-phenyl-5-cyano-indole, 1-methyl-2-(4-methoxy phenyl)-5-cyano-indole, 1-methyl-2-phenyl-5-nitro-indole, 1-methyl-2-phenyl-6-nitro-indole, 1-methyl-2-phenyl-7-nitro-indole, 1,5,7-trimethyl-2-phenyl-indole, 1-methyl-5,7-diethyl-2-phenyl-indole, 1-methyl-5,7-dimethoxy-2-phenyl-indole, 1-methyl-5,7-dichloro-2-phenyl-indole, 1-methyl-5,7-dibromo-2-phenyl-indole, 1-methyl-5,7-bis-trifluoromethyl-2-phenyl-indole, 1-(2-hydroxy propyl)-5,7-dichloro-2-phenyl-indole, 1-(2-hydroxy propyl-5,7-dichloro-2-(4-methoxy phenyl)-indole, 1-(2-hydroxy-2-phenyl-ethyl)-5,7-dimethyl-2-phenyl-indole, 1-(3-acetyl amino-propyl)-2-phenyl-indole, 1-(3-propionyl amino-propyl)-2-phenyl-indole, 1-(3-methoxy carbonyl amino-propyl)-2-phenyl-indole.

The following are examples of suitable coupling components corresponding to formula III from the 5-aminopyrazole series: 3-methyl-5-amino-pyrazole, 1-ethyl-3-methyl-5-amino-pyrazole, 1-propyl-3-methyl-5-amino-pyrazole, 1-isopropyl-3-methyl-5-amino-pyrazole, 1-pentyl-(2)-3-methyl-5-amino-pyrazole, 1-(1,2-dimethyl-propyl)-3-methyl-5-amino-pyrazole, 1-(1,3-dimethyl-butyl)-3-methyl-5-amino-pyrazole, 1-(1,2,2-trimethyl-propyl)-3-methyl-5-amino-pyrazole, 1-pentyl-(3)-3-methyl-5-amino-pyrazole, 1-hexyl-3-methyl-5-amino-pyrazole, 1-heptyl-(3)-3-methyl-5-amino-pyrazole, 1-(1-methyl-2,2-dimethoxy-ethyl)-3-methyl-5-amino-pyrazole, 1-methyl-3-ethyl-5-amino-pyrazole, 1,3-diethyl-5-amino-pyrazole, 1-ethyl-3-carboxy-methyl-5-amino-pyrazole, 1-ethyl-3-carboxy ethyl-5-amino-pyrazole, 1-benzyl-3-methyl-5-amino-pyrazole, 1-phenyl-3-methyl-5-amino-pyrazole, 1-(2-chloro-phenyl)-3-methyl-5-amino-pyrazole, 1-(3- chlorophenyl)-3-methyl-5-amino-pyrazole, 1-(2,5-dichlorophenyl)-3-methyl-5-amino-pyrazole, 1-(4-chlorophenyl)-3-methyl-5-amino-pyrazole, 1-p-tolyl-3-methyl-5-amino-pyrazole, 1-(3-thiacyclopentyl)-3-methyl-5-amino-pyrazole-S-dioxide, 1-o-tolyl-3-methyl-5-amino-pyrazole, 1-m-tolyl-3-methyl-5-amino-pyrazole, 1-phenyl-3-(N,N-dimethyl-carbamoyl)-5-amino-pyrazole, 1-cyclohexyl-3-methyl-5-amino-pyrazole, 1-(2-hydroxy ethyl)-3-methyl-5-amino-pyrazole, 1-(3-hydroxy propyl)-3-methyl-5-amino-pyrazole, 1-(4-hydroxy butyl)-3-methyl-5-amino-pyrazole, 1-(1-methyl-2-hydroxy-ethyl)-3-methyl-5-amino-pyrazole, 1-(1,2-dimethyl-2-hydroxy-ethyl)-3-methyl-5-amino-pyrazole, 1,2,2-trimethyl-2-hydroxy-ethyl)-3-methyl-5-amino-pyrazole, 1-(1-methyl-2,3-dihydroxy-propyl)-3-methyl-5-amino-pyrazole, 1-(2,3-dihydroxy-propyl)-3-methyl-5-amino-pyrazole, 1-(4-hydroxy-cyclohexyl)-3-methyl--5-amino-pyrazole, 1-(4-hydroxy-phenyl)-3-methyl-5-amino-pyrazole, 1-(3-hydroxy-phenyl)-3-methyl-5-amino-pyrazole, 1-(4-hydroxy-methyl-phenyl)-3-methyl-5amino-pyrazole, 1-(4-hydroxy-phenyl)-3-methyl-5-amino-pyrazole 1-(2-chloro-4-hydroxy-phenyl)-3-methyl-5-amino-pyrazole, 1-(2-chloro-4-hydroxymethyl-phenyl)-3-methyl-5-amino-pyrazole, 1-(4-hydroxy phenyl)-3-ethyl-5-amino-pyrazole, 1-[2-(N-(2-hydroxy ethyl)-sulphamoyl)-3-ethyl-methyl-5-amino-pyrazole, 1-[2-(N-methyl-N-(2-hydroxy ethyl)-sulphamoyl)-phenyl]-3-methyl-5-amino-pyrazole, 1-[2-(N-methyl-N-(3-hydroxy propyl)-sulphamoyl)-phenyl]-3-methyl-5-amino-pyrazole, 1-[2-(N,N-bis-(2-hydroxy ethyl)-sulphamoyl)-phenyl]-3-methyl-5-amino-pyrazole, 1-[3-(N-(2-hydroxy ethyl)-sulphamoyl)-phenyl]-3-methyl-5-amino-pyrazole, 1-[3-(N,N-bis-(2-hydroxy ethyl)-sulphamoyl)-phenyl]-3-methyl-5-amino-pyrazole, 1-[2-chloro-5-(N-ethyl-N-(2-hydroxy, ethyl)-sulphamoyl)-phenyl]-3-methyl-5-amino-pyrazole, 1-[2-chloro-5-(N-methyl-N-(2-hydroxy ethyl)-sulphamoyl)-phenyl]-3-methyl-5-amino-pyrazole, 1-[2-chloro-5-(N,N-bis-(2-hydroxy ethyl)-sulphamoyl)-phenyl]-3-methyl-5-amino-pyrazole, 1-[4-(N-(2-hydroxy-ethyl)-sulphamoyl)-phenyl]-3-methyl-5-amino-pyrazole, 1-[4-(N-methyl-N-(2-hydroxy ethyl)-sulphamoyl)-phenyl]-3-methyl-5-amino-pyrazole, 1[4-(N-ethyl-N-(2-hydroxy ethyl)-sulphamoyl)-phenyl]-3-methyl-5-amino-pyrazole, 1-[4-(N-methyl-N-(3-hydroxy propyl)-sulphamoyl)-phenyl]-3-methyl-5-amino-pyrazole, 1-[4-(N,N-bis-(2-hydroxy ethyl)-sulphamoyl)-phenyl]-3-methyl-5-amino-pyrazole, 1-[4-(N,N-bis-(3-hydroxy propyl)-sulphamoyl)-phenyl]-3-methyl-5-amino-pyrazole, 1-[2-chloro-4-(N-ethyl-N-(2-hydroxy ethyl)-sulphamoyl)-phenyl]-3-methyl-5-amino-pyrazole, 1-[2-chloro-4-(N,N-bis-(2-hydroxy ethyl)-sulphamoyl)-phenyl]-3-methyl-5-aminopyrazole, 1-[2,5-dichloro-4-(N-methyl-N-(2-hydroxy ethyl)-sulphamoyl-phenyl]-3-methyl-5-amino-pyrazole, 1-[2,5-dichloro-4-(N,N-bis-(2-hydroxy-ethyl)-sulphamoyl)-phenyl]-3-methyl-5-amino-pyrazole, 1-[2-chloro-5-methyl-4-(N,N-bis-(2-hydroxy ethyl)-sulphamyl)-phenyl]-3-methyl-5-amino-pyrazole, 1-[4-(N,N-bis-(2-hydroxy ethyl)-sulphamoyl)-naphthyl-(1)]-3-methyl-5-amino-pyrazole, 1-[4-(N-methyl-N-(2-hydroxy ethyl)-sulphamoyl)-phenyl]-3-ethyl-5-amino-pyrazole, 1-[4-(N,N-bis-(2-hydroxy ethyl)-sulphamoyl)-phenyl]-3-ethyl-5-amino-pyrazole, 1-(2-hydroxy ethyl)-3-phenyl-5-amino-pyrazole, 1-[4-(N,N-bis-(2-hydroxy ethyl)-sulphamoyl)-phenyl]-3-methyl-5-amino-pyrazole, 1-[2-chloro-4-(N,N-bis-(2-hydroxy propyl)-sulphamoyl)-phenyl]-3-methyl-5-amino-pyrazole, 1-[2-(2-hydroxy ethyl)-hydroxy ethyl]-3-methyl-5-amino-pyrazole, 1-[propionyloxy-(2-hydroxy-ethyl))]-3-methyl-5-amino-pyrazole, 1-[4-(N,N-bis-(2-hydroxy ethyl)-carbamoyl)-phenyl]-3-methyl-5-amino-pyrazole, 1-(4-hydroxy benzyl)-3-methyl-5-amino-pyrazole, 1,3-dimethyl-5-amino-pyrazole.

The polyurethane plastics to be dyed by the process according to the invention can be used for a variety of different purposes, for example as mouldings, films, fibres, foams, lacquers and coating materials.

In addition to the characteristic urethane groups, the polyurethanes may also contain other functional groups, such as amide, urea or carbodiimide groups, in the macromolecule.

The process according to the invention is carried out by adding the dye of formula (1) in a suitable form either to the polyol component or to the polyisocyante component or to the reaction mixture before or during polyurethane formation. The further reaction is carried out in the usual way, i.e. in the manner normally adpoted for non-dyed polyurethane plastics. Relevant particulars may be found in the literature.

The dyes may be added in the solid phase in the form of dye powders, although it is better to add them in the form of a solution or dispersion in a suitable solvent or dispersion medium.

Solutions or dispersions in high-boiling organic liquids have proved to be particularly suitable for foam production. Examples of these high-boiling organic liquids include aliphatic or aromatic esters of phosphoric acid, phosphoric acid, phthalic acid or adipic acid, such as diphenyl isopropyl, diphenyl cresyl, diphenyl octyl, trichloroethyl and tributyl phosphate or dioctyl, butyl benzyl and dibutyl phthlate or dioctyl and octyl benzyl adipate, lactones, for example butyrolactone, alcohols, especially liquid polyalcohols, for example octaethylene glycol and condensation products of adipic acid and 1,3-butane diol or 1,2-propylene glycol, ketones or ethers, having boiling points above 180° C and vapour pressure of less than 1 m bar at 20° C. The polyurethane foams thus dyed may be soft foams, semi-hard foams and also the so-called integral polyurethane foams.

Polyurethane thermoplasts which are dyed with the dyes used in accordance with the invention and which are used in the production of shaped articles by injection moulding, extrusion and calendering, are obtained by adding the dye, in solution or dispersion in a polyol or a diol used as a chain extender, to the reaction mixture or to one of the components thereof, preferably to the polyol component.

Suitable polyols are polyesters containing hydroxyl groups, more especially reaction products of dihydric alcohols with divalent carboxylic acids, and polyethers containing hydroxyl groups, in particular addition products of ethylene oxide, propylene oxide, styrene oxide or epichlorhydrin, with water, alcohols or amines, preferably dialcohols.

Chain-extending diols are, for example, ethylene glycol, diethylene glycol, butane diol, hexane diol, octanediol and hydroquinone-$\beta$-dihydroxy ethyl ether.

In cases where monoalcohols are monoamines are also used for the production of the thermoplastic polyurethane, the dye may also be dissolved or dispersed in these reagents. Examples of suitable monoalcohols are hexanol, octanol, nonyl alcohol or isooctanol.

The dyes of formula (1) are also suitable for dyeing polyurethane systems for coating textiles. The dyed polyurethanes may be used in the form of powders, solutions or dispersions. Particulars of the chemistry involved and methods of application can be found in the literature, for example Melliand Textilberichte 53, 1272–1277 (1972); 52, 1094–1099 (1971) 51, 1313–1317 (1970).

In the case of coating powders, the dye used in accordance with the invention is best dispersed in the polyol component before a prepolymer is prepared by reaction with a diisocyanate, the prepolymer thus prepared finally being reacted with a diamine, accompanied by chain extension, to form a dyed, free-flowing thermoplastic polyurethane powder.

In the case of solutions of the single-component polyurethane coating compositions and in the case of aqueous dispersions, it is easiest to add the dye to the polyol component during production of the polyurethane and to incorporate it into the polyurethane molecule during the reaction with the diisocyanate. In the case of two component polyurethane textile coating compositions, the dye may either be incorporated into the crosslinkable polyurethane or may be added to the crosslinkable polyurethane in the form of a paste dispersed in a suitable medium, for example a solution of a polyester polyurethane in methyl ethyl glycol/toluene, incorporation of the dye being completed in the last stage of the reaction, i.e. during the reaction with a diisocyanate.

Polyurethane elastomers from which elastomer filaments can be produced by conventional methods may be dyed with dyes corresponding to formula (1).

In this case, the dye is finely dispersed in the dihydroxy component before a prepolymer containing NCO groups, into which the dye is chemically incorporated, is prepared by reaction with a diisocyanate.

A polyurethane elastomer solution is obtained from the prepolymer by reaction in solution with a diamine serving as a chain extender. The polyurethane elastomer solution thus prepared can be processed into filaments by dry or wet spinning or even into films by coating the elastomer solution onto glass plates, followed by drying, for example for 30 minutes at 70° C and for 45 minutes at 100° C.

Particulars on the preparation of polyurethane elastomer solutions may be found, for example, in German Offenlegungsschrift 1,962,602.

Polyurethane lacquers are preferably dyed with dyes corresponding to formula (I) by dissolving the dye in the solution containing the polyisocyanate and polyol component. The lacquer thus dyed is applied to the surface to be lacquered and stoved, for example for 30 minutes at 180 ° C. The dye is incorporated in such a way that it does not bleed and can be "relacquered".

Irrespective of the particular application, the dyes are best used in a concentration of from 0.005 to 1.0% and preferably in a concentration of from 0.05 to 0.5%, based on the polyol component.

Polyurethane plastics dyed yellow to red or blue are obtained by the process according to the invention. They may be used for a variety of applications and are distinguished by a very high level of fastness.

EXAMPLE 1 a. A mixture consisting of 10.0% of the dye

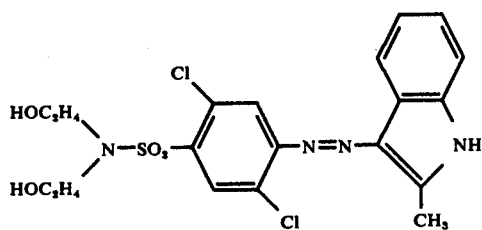

13.5% of butyl benzyl phthlate and 76.5% of a condensation product of adipic acid and 1,2-propylene glycol having a hydroxyl number of 112 – 113 and an acid number of 0.31, is homogenised by stirring and subsequently ground in a standard, continuous stirrer-equipped mill, which contains glass beads 0.3 to 0.4 mm in diameter as grinding elements and whose shaft fitted with circular discs rotates at a speed of 100 rpm, until the particle size of the dye is less than 1 – 2 μ.

To produce a polyurethane foam dyed yellow, 0.5% by weight of the dye dispersion are delivered through a separate metering pump to the mixing chamber of the foaming machine described in German Patent Specification 901,471. After intensive mixing of the reaction components (the recipes for a polyether foam and a polyester foam are described in the following paragraphs), a foam dyed uniformly yellow is obtained, being distinguished by a consistent pore width and by extremely good fastness to light and bleeding.

b. To produce a polyether foam 100 g of a standard trifunctional polyether, prepared from trimethylol propane, propylene oxide and ethylene oxide (OH number 35), 4 g of water, 0.8 g of a polysiloxane-polyalkylene block copolymer as stabiliser, 0.12 g of triethylene diamine as catalyst, 0.16 g of tin octoate and tolylene diisocyanate are used, the tolylene diisocyanate being used in a stoichiometric quantity relative to the quantity of polyether and water.

c. The following components are used for producing a polyester foam: 100 g of a polyester, obtained from adipic acid and diethylene glycol (OH number 50), 4 g of water, 1.4 g of N-methyl morpholine as catalyst, 1.5 g of an emulsifier consisting of an ethylene oxide adduct with a mixture of higher alcohols and having an average molecular weight of 1100 and an OH number of 52, 3.8 g of a sulphonated castor oil, 0.2 g of paraffin oil and tolylene diisocyanate in a stoichiometric quantity relative to the quantity of polyester and water used.

EXAMPLE 2

Dye dispersions are prepared in the same way as in Example 1, except that the adipic acid-propylene glycol adduct is replaced by a polydipropylene glycol adipate having an OH number of 110–111 and an acid number of 0.2 or by a condensation product of adipic acid and 1,3-butane diol having an OH number of 114 and an acid number of 0.36.

Yellow ether and ester foams with excellent fastness properties are also obtained using these dye dispersions.

EXAMPLE 3 a. A yellow dye paste of 20 g of the dye mentioned in Example 1 and 80 g of a polyether which is obtained by reacting 1 mol of trimethylole propane with 3 mols of ethylene oxide and which has an OH number of 550, is prepared as follows:

The dye is kneaded in a dispersion kneader with such a quantity of the above-mentioned polyether that a tough, kneadable mass is obtained (approximately 0.4 g of polyether are used per g of dye). After kneading for 10 minutes, the mass is diluted very slowly with the rest of the polyether while kneading is continued. The dye paste thus prepared is used for dyeing hard integral polyurethane foam.

b. 100 g of a polyol mixture having an OH number of 495 and a viscosity of 1150 cP at 25° C, consisting of 80 g of a polyether having an OH number of 550 obtained by adding ethylene oxide to trimethylol propane, and 20 g of a polyester having an OH number of 370 obtained by reacting 1 mol of adipic acid, 2.6 mols of phthalic acid anhydride, 1.3 mols of oleic acid and 6.9 mols of trimethylol propane are mixed with 1 g of a polysiloxane-polyalkylene oxide block copolymer as foam stabiliser, 0.5 g of tetramethyl guanidine as catalyst, 5 g of monofluorotrichloromethane as blowing agent and 5 g of the dye preparation described above. The mixture is delivered to a two-component mixing and metering unit where it is intensively mixed with 155 g of a polyisocyanate, obtained by phosgenating aniline-formaldehyde-condensates followed by reaction with a diol having an OH number of 480, a viscosity of 130 cP of 25° C and an NCO content of 28% by weight, in order to prepare the foaming reaction mixture and the foaming reaction mixture thus prepared is immediately introduced into a metal mould tempered to 60° C. After 7 minutes, a yellow-dyed moulding of hard integral polyurethane foam having a gross density of 0.6 g/cc can be removed from the mould. Compared with a non-dyed crude moulding, there is no evidence of deterioration in the mechanical properties (E-modulus, flexural strength, elongation at break, impact strength, dimensional stability under heat, etc.) of the dyed moulding.

EXAMPLE 4

100 g of an ethane diol-butane diol adipic acid polyester having a molecular weight of 2000 (OH number 56) are stirred with a paste of 0.1 g of the dye described in Example 1, 22 g of 1,4-butane diol and 1.2 g of n-octanol (0.037 mol, based on 1,4-butane diol). 0.3 g of stearyl amide and 1 g of stabiliser (2,6,2',6'-tetraisopropyl diphenyl carbodiimide) are added, the mixture is heated with stirring at 90° C and then mixed intensively at 60° C with equivalent quantities of 4,4'-diphenyl methane diisocyanate(74.6 g, based on total OH). The mixture is then cast onto a metal plate, the solified product granulated and the granulate injection-moulded.

A polyurethane elastomer moulding dyed yellow in colour is obtained.

EXAMPLE 5 a. 482.5 g of hexane diol polycarbonate having a molecular weight of 1050 are dehydrated at 125° C/14 Torr, followed by the addition at 120° C of 3.4 g of the dye described in Example 1. After stirring for 10 minutes, the mixture is cooled to 100° C and 76.0 g of hexane 1,6-diisocyanate added, and the mixture left standing for one hour at 100° C.

After cooling to 60° C, 4.0 g of N-methyldiethanol amine and 169.5 g of acetone are run in, and the mixture is left to stand for 3 hours at 60° C.

After further cooling to 50° C, 3.1 ml of dimethyl sulphate in 400 g of acetone are added, followed by stirring for 20 minutes.

737 g of a 50% prepolymer solution in acetone having an NCO-content of 1.1% are obtained. 743 g of prepolymer are mixed thoroughly at 45° C with 165 g of 1 n propylene diamine solution in water and 578 g of distilled water.

The acetone is distilled off, the residue washed with water, sifted through a 0.5 mm sieve, filtered under suction and dried.

A yellow, free-flowing thermoplastic polyurethane powder having a melting point of 135° C is obtained, being used for textile coating purposes.

b. The powder described above (spherical particles with an average diameter of 43 $\mu$) is knife-coated onto a parting paper in a layer thickness of 100 g/m$^2$ and then exposed to a temperature of 140° C in a 12 meter long jet tunnel through which the rate of travel is 1.5 meters. A frit is formed which is tough yet elastic, can readily be separated from the substrate and can be handled in the absence of any other support.

c. The frit prepared in accordance with paragraph (b) is recoated with the same powder in a second coating operation (layer thickness 60 g/m$^2$) and subsequently treated at 170 ° C in the tunnel described in Example 1. A homogeneous film dyed yellow in colour is formed, having an overall thickness of 160 g/m$^2$ and a high tensile strength, extremely good elastic properties and outstanding fastness to light.

d. The films formed in accordance with paragraphs (b) and (c) can be combined in the usual way by wet-lamination on one or both sides with any kind of substrate, such as cotton fabrics, polyester fabrics, nonwovens, etc. Wet lamination may be carried out, for example, with polyurethane solutions, polyurethane dispersions or other adhesives. However, lamination can also be carried out on the principle of heat sealing using thermoplastic plastics powders.

e. A porous film prepared in accordance with paragraph (b) is covered with a layer of the polyurethane powder of paragraph (a) (layer thickness 80 g/m$^2$) per knife coating, and then exposed to a temperature of 145° C. A cotton nettle (80 g/m$^2$) is applied under pressure to the powder while it is still plastic. After cooling, the laminate is firmly bonded and can be flexed more than 1,000,000 times in a Bally Flexometer with splitting.

EXAMPLE 6

800 g of an adipic acid mixed polyester with 1,6-hexane diol and 2,2-dimethyl-1,3-propane diol in a molar ratio of 65 : 35 (OH number 65.9), in which 0.8 g of the dye described in Example 1 were finely dispersed, are reacted for one hour at 60° C and then for 3 hours at 70° to 80° C with 15.5 g of N,N-bis-($\beta$-hydroxy propyl)-methyl amine and 786 g of a solution of 260 g of diphenyl methane-4,4-diisocyanate in 650 g of dimethyl formamide which, after standing for one hour, had an NCO content of 9.21%. The preadduct then had an NCO content of 2.37%, based on solid substance.

37.7 g of terephthalic acid-bis-m-aminoanilide are stirred into 600 g of the above NCO-preadduct solution, followed after 3 hours by dilution with 20 g of dimethyl formamide. After a further increase in viscosity, the mixture is diluted with dimethyl formamide until a homogeneous elastomer solution having a viscosity of 640 poises at 20° C is obtained after about 20 hours by which time a total of 850 g of dimethyl formamide has been added. The elastomer substance has an inherent viscosity of 1.30, as measured on a 1% solution in hexamethyl phosphor amide at 25° C. 1% of acetan hydride is added to the solution which is then spun by a conventional dry spinning technique, the fibres being would onto bobbins with 0 and 30% pre-elongation and being heat-fixed in that form for one hour at 130° C. Another part of the solution is wet spun.

Wet-spinning process

A 20% elastomer solution is spun at a rate of approximately 1 ml per minute through a spinneret having 20 bores 0.12 mm in diameter into an approximately three meter long coagulation bath of 90% by weight of water and 10% by weight of dimethyl formamide heated to 80°-85° C, and wound onto a bobbin at a take-off rate of 5 meters per minute after passing through a washing zone (water at 90° C). The packages are stored for 1 hour in water at 50° C and subsequently dried.

Dry-spinning process

A preferably 24 to 26% elastomer solution is spun through a spinneret having 16 bores 0.20 mm in diameter into a 5 meter long duct, heated to 220°-250° C, into which air at approximately 210°-280° C is blown. The filaments are run off at a rate of approximately 100 meters per minute and, after preparation with a talcum suspension, are wound onto bobbins, for example at a rate of 125 to 175 meters per minute, optionally after elongation. The filaments may then be heat treated either in package form or in continuous form. The spinning rates may even be higher, for example 300 to 400 meters per minutes, in which case there is no need for subsequent elongation.

Yellow, highly elastic filaments with extremely good fastness to light and wet strength, coupled with very favourable thermal, hydrothermal and mechanical properties, are obtained.

EXAMPLE 7 a. 35 g of the dye described in Example 1 and 65 g of an 8.5% solution of a polyester polyurethane, obtained by reacting a polyester resin of hexane diol and adipic acid having an average molecular weight of 800 with tolylene diisocyanate (1.4), in methyl ethyl glycol:toluene 1:1, are ground for 12 hours in a ball mill. The dye paste formed is suitable for pigmenting any standard commercial-grade two component polyester-polyurethane textile coating composition.

b. 10 g of the yellow dye paste described in paragraph (a) are slowly stirred into a solution consisting of 30 g of a crosslinkable polyester-polyurethane having terminal OH-groups and 70 g of ethyl acetate. After a short time (3 to 5 minutes) a stable dispersion is obtained, being suitable for use for coating textiles by reverse coating or direct coating following the addition of a polyisocyanate obtained by reacting 1 mol of trimethylol propane and 3 mols of tolylene diisocyanate and a heavy metal salt as accelerator. The polyurethane films prepared with the dispersion by known methods are dyed uniformly yellow in colour without any "speckling" and are unaffected by light and solvents.

EXAMPLE 8

0.3% of the dye described in Example 1, based on polyester content, are dissolved in a 35% solution of a phenol-masked polyisocyanate having an NCO content of 12% and a branched polyester having a hydroxyl content of 12% in a weight ratio of 2:1, in equal parts of cresol, xylene and glycol monomethyl ether acetate. The yellow lacquer is applied to aluminium foil by means of a 2μm lacquering dumbell, followed by stoving for 30 minutes at 180° C. The lacquer retains its colour even after stoving. The dye is incorporated into the hardened binder. The dye does not show any sign of bleeding when the lacquer is "relacquered" with a white stoving lacquer stoved for 30 minutes at 130° C.

EXAMPLE 9

In addition to the dye used in the preceding Examples, the dyes prepared from the diazo and coupling components specified in the following Table may also be successfully used for dyeing polyurethane plastics in shades of yellow to orange in accordance with Examples 1 to 8.

| Component | Coupling component |
|---|---|
| 2,5-dichloro-aniline-[4-N,N-bis-(2-hydroxy ethyl)-sulphamide] | 1-methyl-2-phenyl-indol |
| " | 2-phenyl-indole |
| " | 1-(2-cyanoethyl)-2-phenyl-indole |
| " | 2-(4-methyl phenyl)-indole |
| " | 2-methyl-6-chloro-indole |
| " | 2,4-dimethyl-7-methoxy-indole |
| " | 2-[2-methyl-indolyl-(1)]-propionic acid amide |

-continued

| Component | Coupling component |
|---|---|
| " | 2-(p-biphenylyl)-indole |
| 2,6-dichloro-aniline-[4-N,N-bis-(2-hydroxy ethyl)-sulphonamide] | 2-methyl-5-cyano-indole |
| " | 1-methyl-2-(4-methyl phenyl)-indole |
| " | 1-(2-hydroxy ethyl)-2-phenyl-indole |
| " | 1-(2-acetoxy propyl)-2-phenyl-indole |
| 2,5-dichloro-aniline-4-[N-methyl-N-(2-hydroxy ethyl)-sulphonamide] | 1-methyl-5-methoxy-2-phenyl-indole |
| " | 1-(2-hydroxy propyl)-5-methyl-2-phenyl-indole |
| " | 1-methyl-7-methoxy-2-phenyl-indole |
| " | 1-(2-hydroxy propyl)-5,7-dichloro-2-(4-methoxy phenyl)-indole |
| 2,5-dichloro-aniline-4-(N,N-dimethyl sulphonamide) | 1-(2-hydroxy-n-butyl)-2-phenyl-indole |
| " | 1-(2-hydroxy-2-ethoxycarbonyl-ethyl)-2-phenyl-indole |
| 2,5-dichloro-aniline-4-[N-ethyl-N-(2-cyanoethyl)-sulphonamide] | 1-(2-hydroxy ethyl)-2-phenyl-indole |
| 2,5-dichloro-aniline-4-[N-(2-hydroxy ethyl)-sulphonamide] | 1-(2-aminocarbonyl-ethyl)-(4-bromo-phenyl)-indole |
| " | 1-(2-hydroxy-n-octyl)-2-phenyl-indole |
| 2,5-dichloro-aniline-4-[N-(2-phenethyl)-N-methyl-sulphonamide] | 1-(2-hydroxy-2-phenyl-ethyl)-2-phenyl-indole |
| " | 1-(2-hydroxy butyl)-2-phenyl-indole |
| 2-chloro-aniline-4-[N,N-bis(2-hydroxy ethyl)-sulphonamide] | 1-methyl-2-(p-biphenylyl)-indole |
| 2-chloro-aniline-4-[N-methyl-N-(3-sulpholanyl)-sulphonamide] | 1-(2-hydroxy propyl)-5-methoxy-2-phenyl-indole |
| 2,5-dibromo-aniline-4-[N,N-bis-(2-hydroxy propyl)-sulphonamide] | 1-(2-hydroxy propyl)-2-phenyl-indole |
| " | 2-methyl-indole |
| " | 2-ethyl-indole |
| 6-chloro-aniline-2,4-bis-[N-(2-hydroxy ethyl)-sulphonamide] | 2-methyl-indole |
| 2-chloro-5-bromo-aniline-4-(N,N-pentamethylene-sulphonamide) | 1-(2-hydroxy propyl)-2-methyl-indole |
| 4-chloro-6-methyl-aniline-2-[N,N-bis-(2-hydroxy ethyl)-sulphonamide] | 2-methyl-indole |
| 4-chloro-6-methyl-aniline-2-[N,N-bis-(2-hydroxy ethyl)-sulphonamide] | 2-methyl-5-ethoxy-indole |
| 4-chloro-5-methyl-aniline-2-[N-(3-hydroxy ethyl)-N-methyl-sulphonamide | 1-(1-hydroxy methyl-ethyl)-2-phenyl-indole |
| " | 1-(2-hydroxy propyl)-5-chloro-2-phenyl-indole |
| 2,5,6-trichloro-aniline-3-[N-(2-hydroxy butyl)-sulphonamide | 1-(2-hydroxy-2-phenyl-ethyl)-5-methoxy-2-methyl-indole |
| " | 2-methyl-indole |
| 4,6-dichloro-aniline-2-[N,N-bis-(2-hydroxy ethyl)-sulphonamide] | 2-methyl-indole |
| " | 1-ethyl-2-phenyl-indole |
| " | 1-(2-cyanoethyl)-2-phenyl-indole |
| " | 1-(3-amino propyl)-2-phenyl-indole |
| " | 2-(methyl-indolyl-(1)-propionic acid amide |
| 2-cyano-aniline-4-[N-(2-methoxy ethyl)-N-ethyl-sulphonamide] | 1-(2-hydroxy propyl)-2-phenyl-5-trifluoro-methyl-indole |
| 2-cyano-aniline-4-[N,N-bis-(2-hydroxy-butyl)-sulphonamide | 2,4-dimethyl-7-methoxy-indole |
| " | 2-methyl-5-chloro-indole |
| N-(2,5-dichloro-4-amino-benzene-sulphonyl)-morpholine | 1-(2-hydroxy-2-ethoxycarbonyl-ethyl)-2-phenyl-indole |
| N-(2,5-dichloro-4-amino-benzene sulphonyl)-piperidine | 1-(2-hydroxy butyl)-2-(4-methoxy phenyl)-indole |
| 2-methyl sulphonyl-aniline-4-[N,N-bis-(2-hydroxy ethyl)-sulphonamide] | 1-methyl-5-propoxy-2-phenyl-indole |
| " | 1-(1-hydroxy methyl-propyl)-2-phenyl-indole |
| 2-[(2-cyanoethyl)-sulphonyl]-aniline-4-[N-methyl-N-(2-hydroxy ethyl)-sulphonamide] | 1-methyl-7-isopropyl-2-phenyl-indole |
| 2-chloro-aniline-4-[N-(3-amino propyl)-sulphonamide] | 1-(2-hydroxy propyl)-5-methyl-2-phenyl-indole |
| " | 1-(3-aminopropyl)-2-phenyl-indole |
| 2,6-dicyano-aniline-4-[N,N-bis-(2-hydroxy propyl)-sulphonamide] | 1-(1-acetoxy methyl-propyl)-2-methyl-indole |

-continued

| Component | Coupling component |
|---|---|
| "2-methyl-indole | 1,6-dimethyl-2-phenyl-indole |
| 1-amino-naphthalene-4-[N-methyl-N-(2-hydroxy ethyl)-sulphonamide] | 2-methyl-indole |
| " | 1-(1-hydroxy methyl-propyl)-2-phenyl-indole |
| 1-amino-naphthalene-4-[N,N-bis-(2-hydroxy ethyl)-bulphonamide] | 1-methyl-7-ethyl-2-phenyl-indole |
| " | 1-methyl-2-(p-biphenylyl)-indole |
| (4-chlorophenyl)-indole | 1-(2-hydroxy-propyl)-2-phenyl-indole |
| " | 1-methyl-2-(2-naphthyl)-indole |
| 2-trifluoromethyl-aniline-4-[N-(2-hydroxy ethyl)-sulphonamide] | 2-methyl-indole |
| " | 1-(2-hydroxy-3-phenoxy-propyl)-2-phenyl-indole |
| 2-trifluoromethyl-5-chloro-aniline-4-[N,N-bis-(2-hydroxy ethyl)-sulphonamide] | 2-methyl-indole |
| 2,5-bis-(trifluoromethyl)-aniline-4-[N,N-bis-(2-hydroxy ethyl)-sulphonamide] | 2-methyl-7-methoxy-indole |
| " | 2-methyl-5-trifluoro-methyl-indole |
| " | 1,7-dimethyl-2-phenyl-indole |
| 2,5-dichloro-aniline-4-(N-methyl-N-benzyl-sulphonamide) | 1-(2-hydroxy propyl)-5-methyl-2-phenyl-indole |
| 2,4-dichloro-aniline-5-[N,N-bis-(2-hydroxy ethyl)-carbonamide] | 2-methyl-indole |
| " | 1-methyl-2-phenyl-indole |
| " | 1-propyl-2-phenyl-indole |
| " | 1-(2-hydroxy butyl)-2-(4-bromophenyl)-indole |
| " | 1-(2-cyanoethyl)-2,6-dimethyl-indole |
| 2,4-dichloro-aniline-5-[N-methyl-N-(2-hydroxy ethyl)-carbonamide] | 2-methyl-indole |
| " | 1-(2-carboxy ethyl)-2-phenyl-indole |
| " | 1-(2-hydroxy propyl)-2-(p-biphenylyl)-indole |
| 2,5-dichloro-aniline-4-[N,N-bis-(2-hydroxy ethyl)-carbonamide] | 2-methyl-indole |
| " | 1-methyl-2-phenyl-indole |
| " | 1-methyl-2-(4-methyl-phenyl)-indole |
| 2,5-dibromo-aniline-4-[N-methyl-N-(2-hydroxy ethyl)-carbonamide] | 2-methyl-indole |
| " | 1-(2-hydroxy butyl)-2-methyl-indole |
| 5-chloro-2-[N,N-bis-(2-hydroxy-ethyl)-carbamoyl]-aniline-4-[N,N-bis-(2-hydroxy ethyl)-sulphonamide] | 1-methyl-2-phenyl-indole |
| 2,5-bis-[N,N'-(2-hydroxy ethyl)-carbamoyl]-aniline | 2-methyl-indole |
| " | 2-methyl-indole |
| | 1-(1-hydroxy methyl ethyl)-2-phenyl-indole |
| 2,4,5-trichloro-aniline | " |
| 2,4-dibromo-aniline | |
| 2-trifluoromethyl-4-chloro-aniline | 1-(2-hydroxy butyl)-2-phenyl-indole |
| 2-carbomethoxy-4-chloro-aniline | " |
| 2,5-bis-carboethoxy-aniline | 1-(2-hydroxy-2-phenyl-ethyl)-2-phenyl-indole |
| 2-cyano-5-chloro-aniline | |
| 2,5-dichloro-4-cyano-aniline | 1-(2-hydroxy butyl)-2-phenyl-indole |
| 2,4-dicyano-3,5-dimethyl-aniline | 1-(2-hydroxy butyl)-2-phenyl-indole |
| 2-cyano-4-(2-hydroxy ethyl)-aniline | " |
| 2-cyano-4-methyl sulphonyl-aniline | " |
| 2-cyano-4-phenyl sulphonyl-aniline | 1-(2-hydroxy propyl)-2-phenyl-indole |
| 2-chloro-aniline-4-(N,N-dimethyl sulphonamide) | 1-(2-hydroxy ethyl)-3-methyl-5-amino-pyrazol |
| " | 1-(4-hydroxy methyl-phenyl)-3-methyl-5-amino-pyrazole |
| " | 1-[2-(N-(2-hydroxy ethyl)-sulphamoyl-phenyl]-3-methyl-5-amino-pyrazole |
| 2,5-dichloro-aniline-4-[N,N-bis-(2-hydroxy ethyl)-sulphonamide] | |

| Component | Coupling component |
|---|---|
| " | 3-methyl-5-amino-pyrazole |
| " | 1-ethyl-3-methyl-5-amino-pyrazole |
| " | 1-phenyl-3-methyl-5-amino-pyrazole |
| " | 1-(2-chloro-pheny)-3-methyl-5-amino-pyrazole |
| 2,5-dichloro-aniline-4-[N,N-bis-(2-hydroxy ethyl)-sulphonamide | 1-cyclohexyl-3-methyl-5-amino-pyrazole |
| " | 1-benzyl-3-methyl-5-amino pyrazole |
| " | 1-(2-phenethyl)-3-methyl-5-amino-pyrazole |
| 2,5-dichloro-aniline-4-(N,N-dimethyl-sulphonamide) | 1-[4-(N,N-bis(2-hydroxy ethyl)-2-sulphamoyl-naphthyl-(1)]-3-methyl-5-amino-pyrazole |
| 2,5-dichloro-aniline-4-[N,N-bis-(2-hydroxy propyl)-sulphonamide] | 1-ethyl-3-carboxy butyl-5-amino-pyrazole |
| " | 1-phenyl-3-(N-ethyl-carbamoyl)-5-amino-pyrazole |
| 2,6-dichloro-aniline-4-[N-methyl-N-(2-hydroxy ethyl)-sulphonamide] | 1-(3-hydroxy propyl)-3-methyl-5-amino-pyrazole |
| " | 1-(1,2,2-trimethyl-2-hydroxy-ethyl)-3-methyl-5-amino-pyrazole |
| 4-chloro-6-methyl-aniline-2-(N,N-dipropyl-sulphonamide) | 1-[2-(N,N-bis-(2-hydroxy-ethyl)-sulphamoyl)phenyl]-3-methyl-5-amino-pyrazole |
| 4-ethyl sulphonyl-aniline-2-[N-(2-hydroxy ethyl)-sulphonamide] | 1-[2-chloro-4-(N-ethyl-N-(2-hydroxy ethyl)-sulphamoyl)-phenyl]-3-methyl-5-amino-pyrazole |
| 2-cyano-aniline-4-[N-(2-hydroxy ethyl)-sulphonamide | 1-phenyl-3-methyl-5-amino-pyrazole |
| " | 1-benzyl-3-methyl-5-amino-pyrazole |
| 2,5-bis-trifluoromethyl-aniline-4-[N,N-bis-(2-hydroxy ethyl)-sulphonamide] | 1-phenyl-3-(N,N-dimethyl carbamoyl)-5-amino-pyrazole |
| " | 1-(2,5-dichloro-phenyl)-3-methyl-5-amino-pyrazole |
| 2,4-dicyano-aniline | 1-m-tolyl-3-methyl-5-amino-pyrazole |
| | 1-[4-(N,N-bis-(2-hydroxy ethyl)-carbamoyl)-phenyl]-3-methyl-5-amino-pyrazole |
| 2,4-dicyano-5-chloro-aniline | " |
| 2-cyano-5-chloro-aniline | 1-[2-chloro-4-(N,N-bis-(2-hydroxy propyl)-sulphamoyl)-phenyl]-3-methyl-5-amino-pyrazole |
| 2,5-dicyano-4-(N,N-dimethyl-sulphamoyl)-aniline | |
| 2,6-dicyano-aniline-(N-butyl sulphonamide) | |
| " | 1-(1-methyl-2,3-dihydroxy propyl)-3-methyl-5-amino-pyrazole |
| | 1-[2,5-dichloro-4-(N,N-bis-(2-hydroxy propyl)-sulphamoyl)-phenyl]-3-methyl-5-amino-pyrazole |
| 1-amino-naphthalene N,N-bis-(2-hydroxy propyl)-sulphonamide] | 1-(3-thiacyclopentyl)-3-methyl-5-amino-pyrazole-S-dioxide |
| " | 1,3-diethyl-5-amino-pyrazole |
| " | 1-ethyl-3-carboxy methyl-5-amino-pyrazole |
| trifluromethyl-aniline-4-[N-(2-hydroxy ethyl)-sulphonamide] | 1-isopropyl-3-methyl-5-amino-pyrazole |
| " | 1-hexyl-3-methyl-5-amino pyrazole |
| 2-cyano-4-methoxy-aniline | 1-[2-N-(2-hydroxy ethyl)-sulphamoyl-phenyl]-3-methyl-5-amino-pyrazole |
| 2,4,6-tricyano-aniline | |
| 2-cyano-4-(2-hydroxy-ethyl)-aniline | 1-(2-cyanoethyl)-3-methyl-5-amino-pyrazole |
| 2-cyano-4-chloro-6-[N,N-bis-(2-hydroxy ethyl)-sulphamoyl]-aniline | 1-(2-trifluormethyl-phenyl)-3-methyl-5-amino-pyrazole |
| 2,3,4-trichloro-6-cyao-aniline | 1-[4-(N,N-bis-(2-hydroxy ethyl)-sulphamoyl)-phenyl]-3-methyl-5-amino-pyrazole |
| 2-cyano-4-methyl sulphonyl-aniline | " |
| 2,5-dicyano-4,6-dichloro-aniline | 1-[4-(N,N-bis-(2-hydroxy ethyl)-sulphamoyl)-phenyl]-3-ethyl-5-amino-pyrazole |
| 2,5-dibromo-aniline-4-[N,N-bis-(2- | 1-(2-hydroxy ethyl)-3- |

-continued

| Component | Coupling component |
|---|---|
| hydroxy butyl)-sulphonamide] | phenyl-5-amino-pyrazole |

We claim:
1. A process for dyeing polyurethane plastic by incorporating a dye in the reaction mixture used to prepare the polyurethane by polyaddition reaction or to one of the components of the polyaddition reaction mixture, before or during polyaddition; said dye being capable of forming covalent bonds with said polyurethane, said dye having the formula

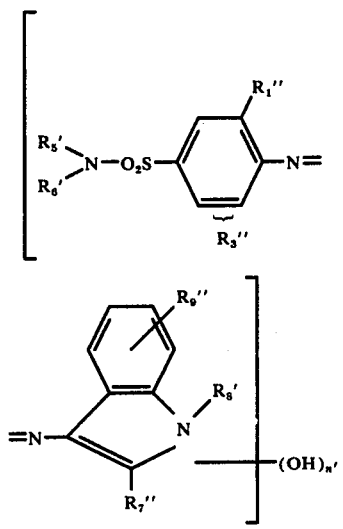

in which
$n'$ is 1, 2 or 4;
$R_1''$ is cyano, chlorine, bromine or methyl;
$R_3''$ is hydrogen, chlorine, bromine or methyl;
$R_5'$ is hydrogen; alkyl; cyclohexyl; benzyl; phenethyl; phenyl; tolyl; tolyl substituted by hydroxy, cyano, chlorine, bromine or $C_1$-$C_4$ alkoxy;
$R_6'$ is hydrogen; $C_1$-$C_4$ alkyl; benzyl; phenethyl; phenyl; tolyl; tolyl substituted by hydroxy, cyano, chlorine, bromine or $C_1$-$C_4$ alkoxy; or
$R_6'$ together with $R_5'$ and the nitrogen atom are pyrrolidinyl, piperidinyl or morpholinyl;
$R_7''$ is methyl, ethyl, phenyl, p-biphenyl, or o-, m- or p-chlorophenyl;
$R_8'$ is hydrogen; $C_1$-$C_4$ alkyl; or $C_1$-$C_4$-alkyl substituted by OH, CN, $CONH_2$ or COOH;
$R_9''$ is hydrogen, chlorine, bromine, methyl, ethyl, methoxy or ethoxy;
wherein the OH-groups are attached to the molecule through alkylene radicals.
2. Polyurethane plastics dyed by the process of claim 1.
3. The process of claim 1 wherein a dyed polyurethane foam is produced.
4. A process for dyeing polyurethane plastic by incorporating a dye in the reaction mixture used to prepare the polyurethane by polyaddition reaction or to one of the components of the polyaddition reaction mixture, before or during polyaddition; said dye being capable of forming covalent bonds with said polyurethane, said dye having the formula

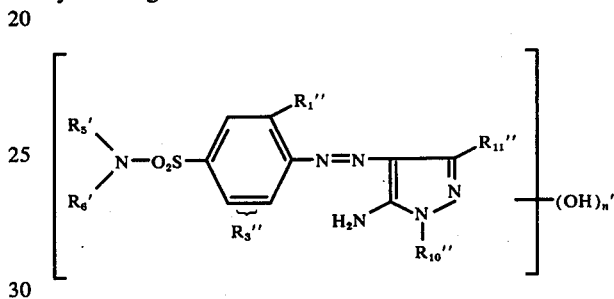

$R_1''$ is cyano, chlorine, bromine or methyl;
$R_3''$ is hydrogen, chlorine, bromine or methyl;
$R_5'$ is hydrogen; alkyl; cyclohexyl; benzyl; phenethyl; phenyl; tolyl; tolyl substituted by hydroxy, cyano, chlorine, bromine or $C_1$-$C_4$ alkoxy;
$R_6'$ is hydrogen; $C_1$-$C_4$ alkyl; benzyl; phenethyl; phenyl; tolyl; tolyl substituted by hydroxy, cyano, chlorine, bromine or $C_1$-$C_4$ alkoxy; or
$n'$ is 1, 2 or 4;
$R_{10}''$ is hydrogen; $C_1$-$C_4$ alkyl; $C_1$-$C_4$-alkyl substituted by hydroxy; phenyl; or phenyl substituted by chlorine, methyl or sulphamoyl monosubstituted or disubstituted by $C_1$-$C_4$-alkyl;
$R_{11}''$ is methyl; and
the OH-groups are attached to the molecule through alkylene radicals.
5. Polyurethane plastic dyed by the process of claim 4.
6. The process of claim 4 in which a polyurethane foam is produced.

* * * * *